(12) United States Patent
Wories

(10) Patent No.: US 7,627,563 B2
(45) Date of Patent: Dec. 1, 2009

(54) OBJECT MODEL-BASED OBJECT HIERARCHY DISCOVERY AND NAVIGATION

(75) Inventor: Michiel Johannes Wories, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 210 days.

(21) Appl. No.: 11/612,595

(22) Filed: Dec. 19, 2006

(65) Prior Publication Data

US 2008/0147721 A1 Jun. 19, 2008

(51) Int. Cl.
G06F 17/30 (2006.01)
(52) U.S. Cl. ............................. 707/3; 707/102; 707/200
(58) Field of Classification Search .................. 707/2, 707/1, 3, 100, 102, 200
See application file for complete search history.

(56) References Cited

U.S. PATENT DOCUMENTS

| | | | |
|---|---|---|---|
| 5,878,415 A | | 3/1999 | Olds |
| 6,003,040 A | * | 12/1999 | Mital et al. ............. 707/103 R |
| 6,128,611 A | | 10/2000 | Doan et al. |
| 6,141,660 A | | 10/2000 | Bach et al. |
| 6,418,448 B1 | * | 7/2002 | Sarkar ..................... 707/104.1 |
| 6,442,566 B1 | | 8/2002 | Atman et al. |
| 6,484,177 B1 | * | 11/2002 | Van Huben et al. ........... 707/10 |
| 6,539,398 B1 | | 3/2003 | Hannan et al. |
| 6,823,338 B1 | | 11/2004 | Byrne et al. |
| 6,834,286 B2 | | 12/2004 | Srinivasan et al. |
| 7,028,037 B1 | | 4/2006 | Agarwal et al. |
| 7,107,280 B2 | | 9/2006 | Tomic et al. |

OTHER PUBLICATIONS

Dobson. "Managing SQL Server Using the SQL-DMO Object Model from Access" http://msdn.microsoft.com/library/default.asp?url=library/en-us/dnovba01/html/ManagingSQRLServer.asp last viewed Sep. 22, 2006, 13 pages.
Agarwal, et al/ "Modeling Multidimensional Databases" (1995) Proceedings of the 13th International Conference on Data Engineering, 12 pages.
Rose, et al. "Hirearchical Classification as an Aid to Database and Hit-List Browsing" (1994) ACM, 7 pages.
Alho, et al. "A Design Data Manager" (1998) ACM, 1 page.

* cited by examiner

Primary Examiner—James Trujillo
Assistant Examiner—William Spieler
(74) Attorney, Agent, or Firm—Workman Nydegger

(57) ABSTRACT

Discoverability and/or navigation of database object hierarchies are provided utilizing database object models based on a common framework. Typical instances also incorporate a standardized interface for interaction with a navigation component (e.g., command line environment), allowing a single navigation component to interface with diverse database object models. Database object hierarchies can be requested and discovered via this interface. The interface can also support navigation of database object hierarchy structures. The database object model can provide the database object hierarchy by utilizing document and/or script mechanisms such as, for example, extensible markup language (XML) files. In some instances, additional metadata can be included to indicate additional structure information such as, for example, navigability of an object. Thus, a command line can be employed to discover database object hierarchy and/or to access management objects representing the database server objects, including its operations.

8 Claims, 12 Drawing Sheets

FIG. 6

OBJECT MODEL-BASED OBJECT HIERARCHY DISCOVERY AND NAVIGATION

BACKGROUND

Database servers typically require management. Currently, there are various management facilities that make database server management accessible to a broad range of users. Some database server management utilities allow quick access to database server management functionality using an intuitive graphical user interface (GUI). However, power users (i.e., advanced users), who need to automate tasks from a command line environment utilize non-graphical interfaces to speed up the management process. Thus, a user typically must choose either an easy-to-user interface or an efficient interface. There is no means by which the divide between GUI and non-GUI processes can be easily bridged. One of the aspects that make the GUI very accessible is that a database server structure is visualized in a graphical way—a hierarchy of nodes (e.g., containers and objects) and with each of these nodes applicable operations are easily accessible. The command line environment does not provide this level of discoverability of hierarchy and operations.

SUMMARY

Database object models are leveraged to allow discoverability and/or navigation of database object hierarchies via command line environments. Typical instances provide a standardized interface for interaction with a navigation component (e.g., command line environment). The standardized interface allows a single navigation component to interface with diverse database object models, substantially reducing the workload and learning curve of users. Database object hierarchies can then be requested and discovered via this interface. The interface can also support navigation of database object hierarchy structures. The database object model can provide the database object hierarchy by utilizing document and/or script mechanisms such as extensible markup language (XML) files and the like to make itself self-describing. In some instances, additional metadata can be included to indicate additional structure information such as, for example, navigability of an object and the like. Thus, a command line can be employed to discover database object hierarchy and/or to access management objects representing the database server objects, including its operations. This combines the ease-of-use of a GUI with the power of a command line environment, allowing users access to database object hierarchies without requiring deployment of a GUI program.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

BRIEF DESCRIPTION OF THE DRAWINGS

FIG. 6 is an illustration of an example of discovering database object hierarchy in accordance with an aspect of an embodiment.

DETAILED DESCRIPTION

Figure 1:
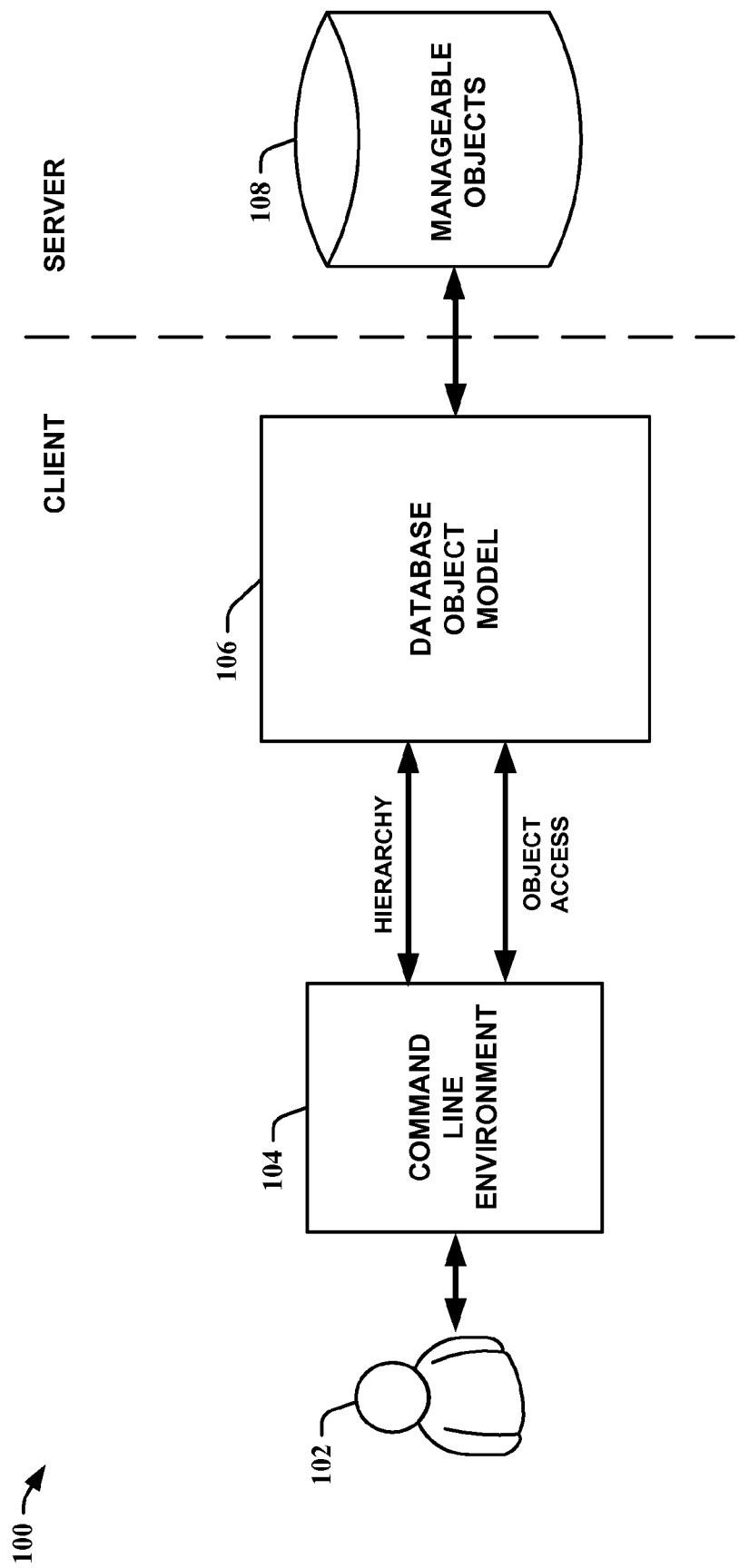
FIG. 1 is a block diagram of a database object navigation system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

Instances herein utilize a database object model to provide discovery and/or navigation of database object hierarchies. A standardized interface or common object model framework with base interfaces can be employed to allow a navigation component to interact with diverse database object models.

This permits users to interact with database object hierarchies via a command line, substantially simplifying database object management. Information regarding database object hierarchies can be compiled by scripts and/or documents (e.g., XML files) and the like to make object model hierarchy self-describing.

FIG. 1 illustrates a database object navigation system 100 that utilizes a database object model 106 to provide information regarding manageable objects 108 and interact with a command line environment 104 to relay this information to a user 102. The user 102 can enter commands into the command line environment 104 to connect, request and/or retrieve a database object hierarchy from the database object model 106. When the database object model 106 follows a framework described herein, it is self-describing in regards to its structure. With knowledge of the database object hierarchy, the user 102 can then navigate the hierarchy via the command line environment 104 and subsequently the database object model 106. This is partially accomplished by the database object model 106 providing object access to the command line environment 104. Although not required, this example illustrates the command line environment 104 and the database object model 106 residing client-side while the manageable objects 108 reside server-side.

The database object model 106 and the manageable objects 108 can communicate via local and/or global communication means such as, for example, LAN, WAN, the Internet, intranet, etc. The communications can also be via wired and/or wireless communication means such as, for example, cell, satellite, and other wireless communications. Because the database object model 106 provides database object hierarchies and access to objects, the user 102 can utilize the command line environment 104 to perform maintenance functions. This allows the user 102 to have increased functionality while utilizing the command line environment 104, substantially increasing the level of control over maintaining database objects.

Figure 2:
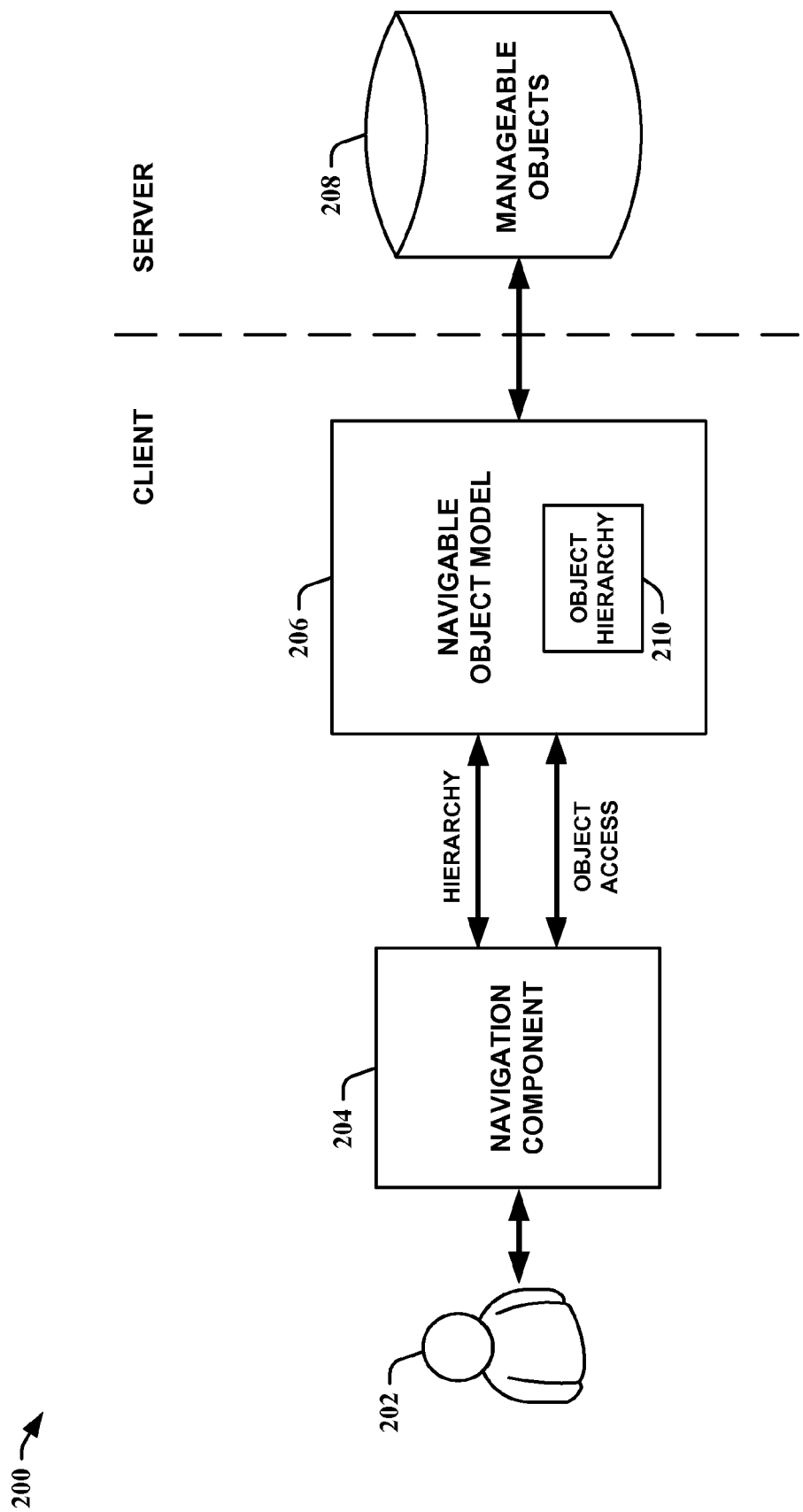
FIG. 2 is another block diagram of a database object navigation system in accordance with an aspect of an embodiment.
Figure 3:
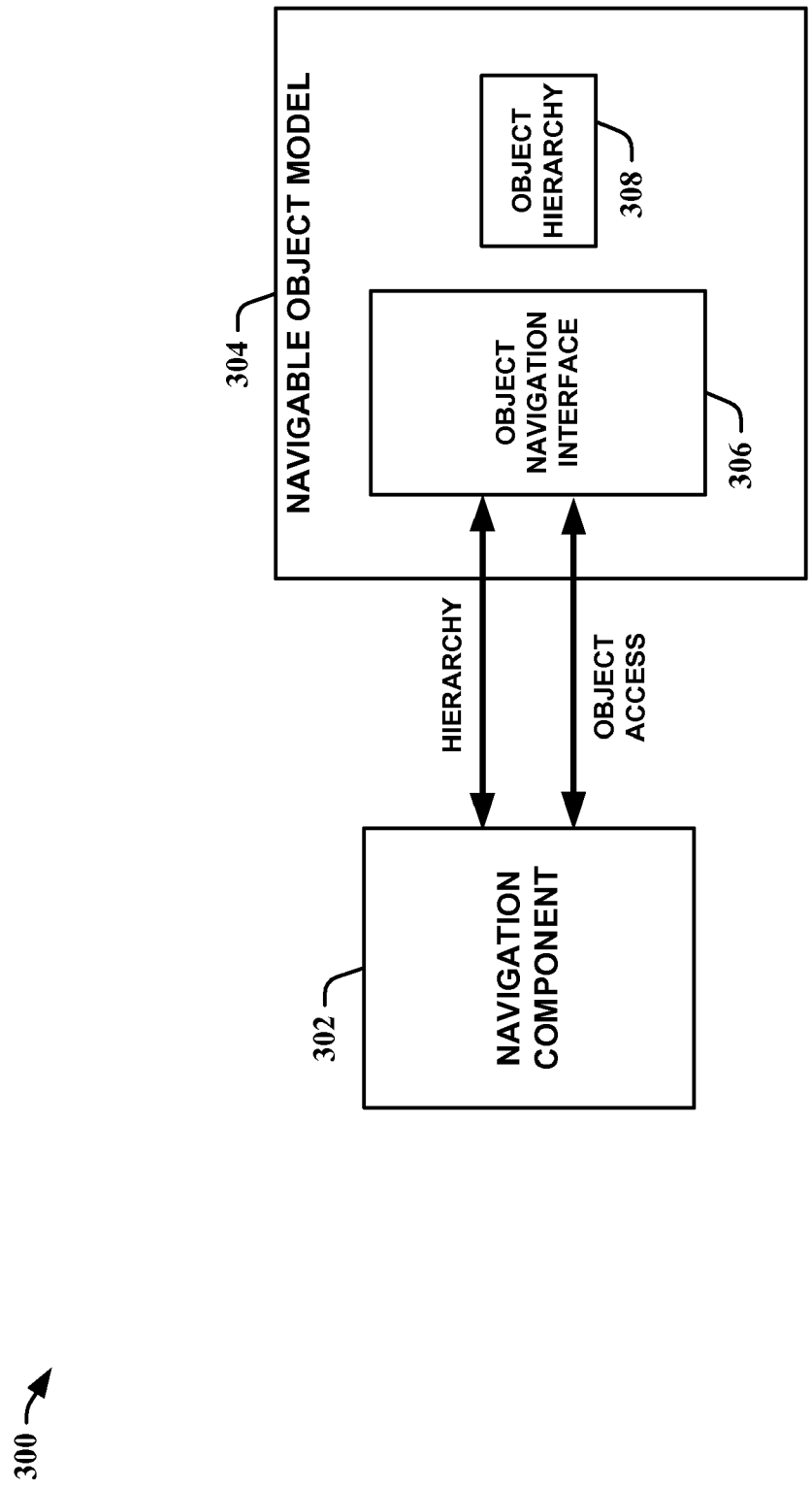
FIG. 3 is yet another block diagram of a database object navigation system in accordance with an aspect of an embodiment.

In FIG. 2, a database object navigation system 200 utilizes a navigable object model 206 to provide information about manageable objects 208 to a user 202 via a navigation component 204. The navigable object model 206 is based upon a common object model framework that includes "hooks" to permit database object hierarchies to be discovered and/or navigated. In this example, the navigable object model 206 utilizes an object hierarchy document 210 that contains information regarding the structure of database object hierarchies associated with database objects 208. The object hierarchy document 210 can be, for example, a file based on an extensible markup language (XML) and the like. In other examples, the navigable object model 206 can utilize scripts to provide the database object hierarchies as well. Thus, the navigable object model 206 can discover database object hierarchies automatically and/or when prompted by the navigation component 204. When the database object hierarchy is known, the user 202 can then navigate its structure via the navigation component 204. The framework of the navigable object model 206 permits the navigation component 204 to interact with the manageable objects 208. The navigation component 204 can be, for example, a command line environment as illustrated previously. Although typically the navigation component 204 and the navigable object model 206 reside client-side and the manageable objects 208 reside server-side, they can also be co-located and/or the navigation component 204 and the navigable object model 206 can have functionality of both components in a single component.

A database object navigation system 300 can also include a navigable object model 304 that utilizes an object navigation interface 306 to communication object hierarchy 308 to a navigation component 302. By employing the object navigation interface 306 as part of a common object model framework of the navigable object model 304, the navigation component 302 can easily communicate its intentions with the navigable object model 304 in a predictable fashion. In some instances, the object navigation interface 306 is standardized. When object models that adhere to a common object model framework that includes the standardized interface, they can communicate with a generic version of the navigation component 302. Generally, the framework includes utilizing a base class type of connection that other connections can be built upon. This allows connections to the navigable object model 304 to be standardized, allowing generic versions of the navigation component 302 to be utilized. Context is typically provided when the navigation component 302 first connects. Thus, regardless of the type of the object model, as long as it adheres to the standardized framework for discovering and/or navigating database object hierarchies, the navigation component 302 can connect and interact with it to obtain database object information.

Figure 4:
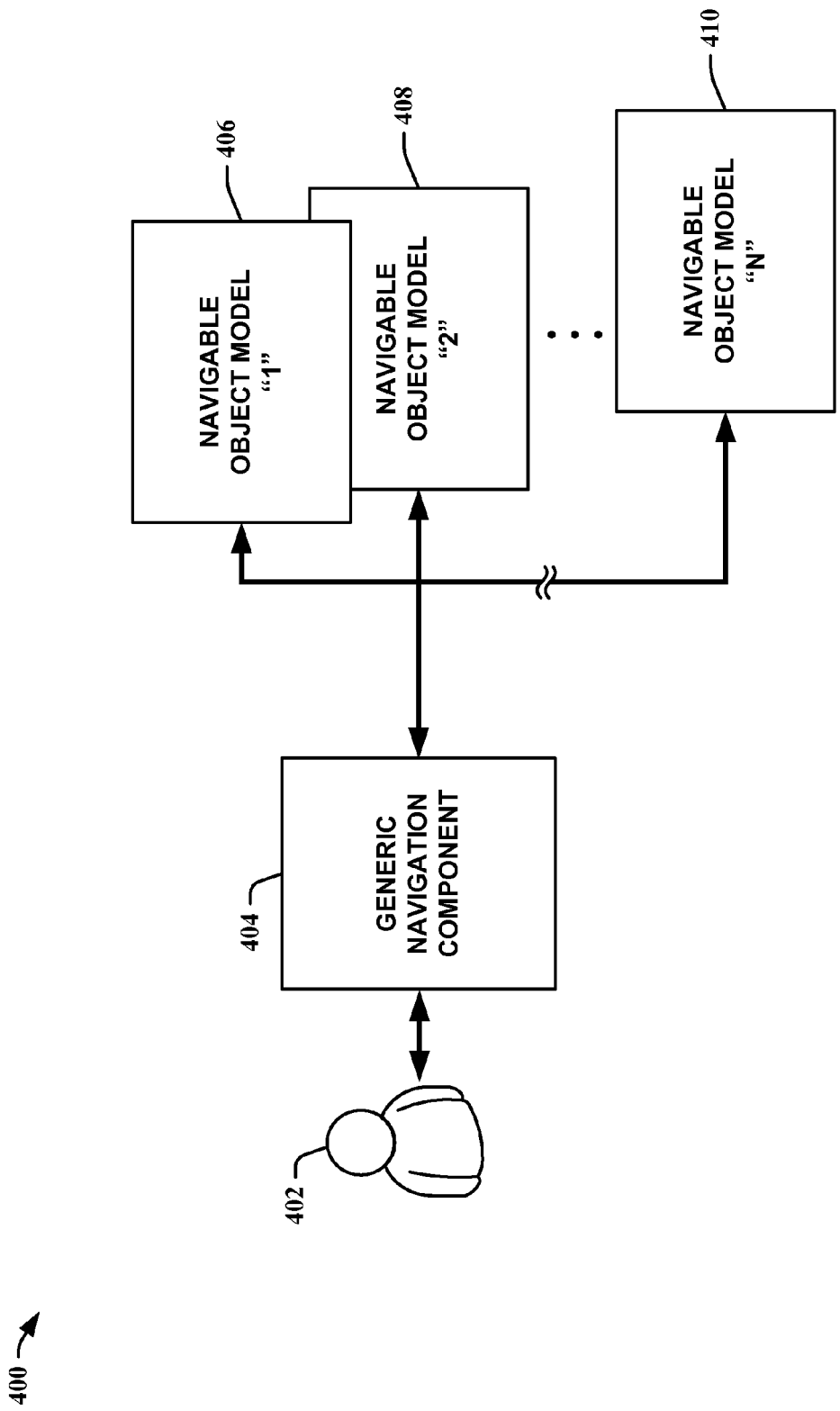
FIG. 4 is a block diagram of a navigation component interacting with multiple navigable object models in accordance with an aspect of an embodiment.

FIG. 4 illustrates how a generic navigation component 404 can interface with multiple, diverse navigable object models 1-N 406-410, where N is an integer from one to infinity, that employ a standardized database object discovery and/or navigation object model framework. This allows the generic navigation component 404 to be written once and disseminated to clients. A user 402 is only required to learn a single interface provided by the generic navigation component 404 to access diverse navigable object models 1-N 406-410. This substantially reduces the learning curve and empowers the user 402 with increased control over multiple types of server database software from a single interface.

Figure 5:
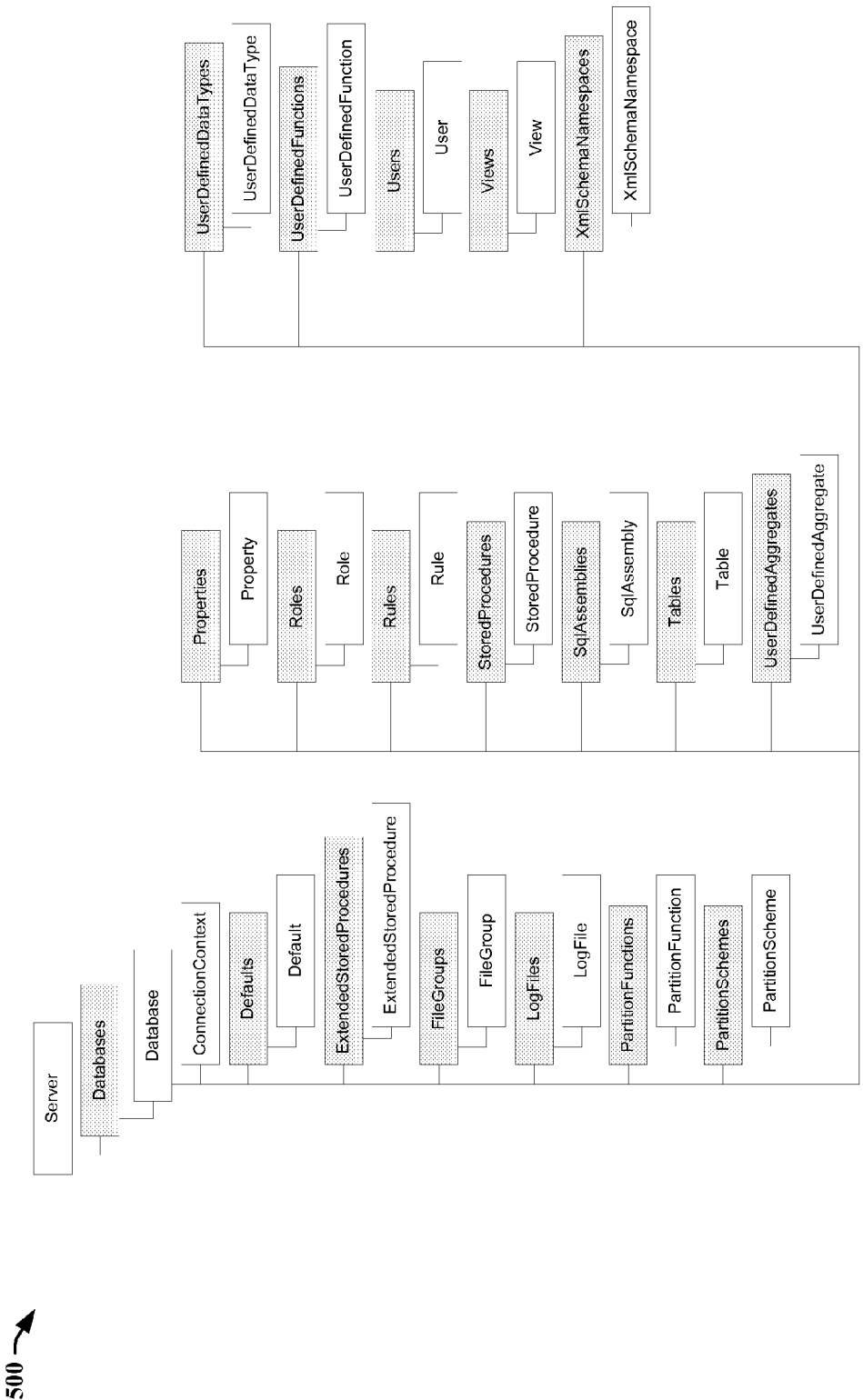
FIG. 5 is an illustration of an example database object hierarchy in accordance with an aspect of an embodiment.
Figure 7:
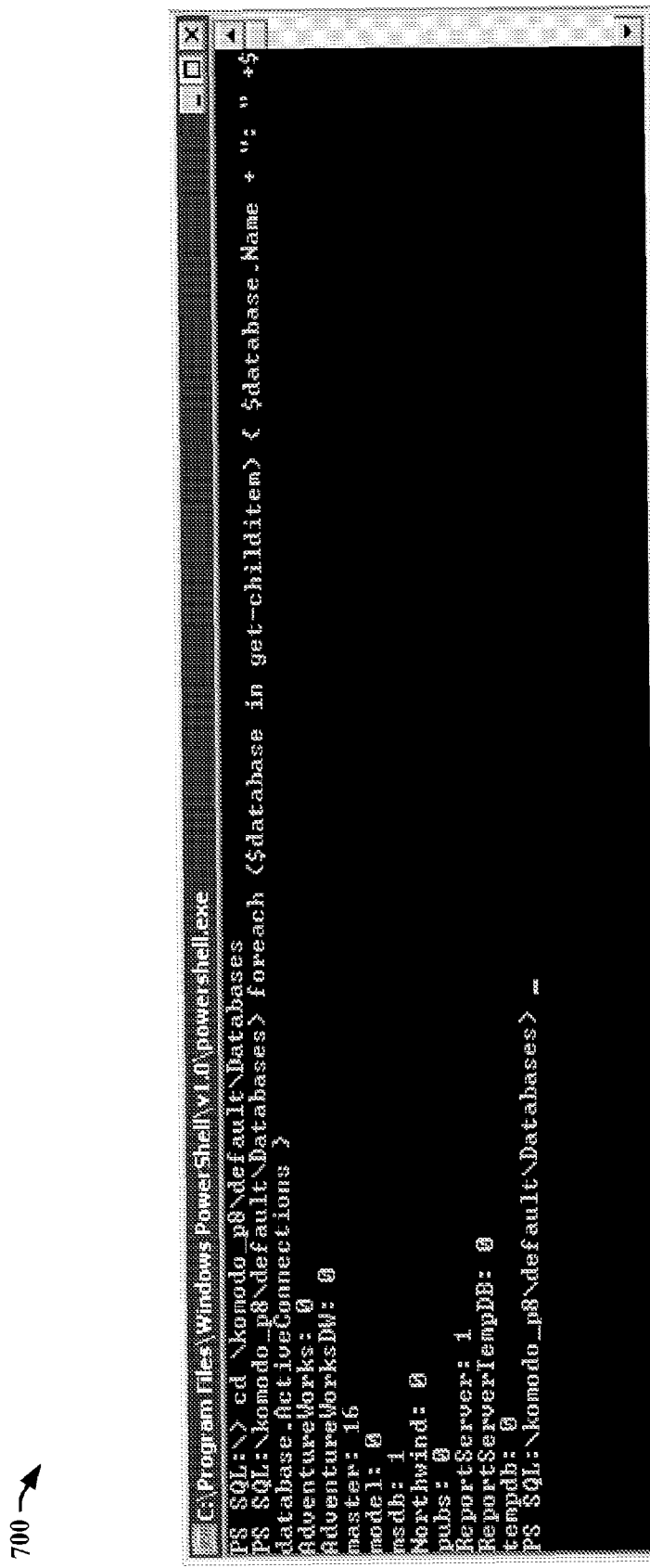
FIG. 7 is an illustration of an example of accessing management functionality in accordance with an aspect of an embodiment.
Figure 8:
FIG. 8 is an illustration of an example of performing an operation in accordance with an aspect of an embodiment.

One instance utilizes a Microsoft's Windows SQL Server Management Object (SMO) model that interfaces with Microsoft's Windows PowerShell, providing a navigable object model and navigation component respectively. The SQL SMO model allows discovery of a SQL server hierarchy, returning access to objects in the hierarchy so management operations can be performed. However, PowerShell is not a requirement for the implementation—other scripting environments can be utilized as a navigation component as well. Powershell (i.e., navigation component) allows users to connect to a SQL server instance and to discover and/or traverse the object hierarchy. To further illustrate, a portion of a SQL server object hierarchy 500 is depicted in FIG. 5. FIG. 6 illustrates an example 600 of a simple PowerShell script which traverses a part of an object hierarchy and then lists a set of objects at a selected level in the hierarchy. As FIGS. 5 and 6 illustrate, a user does the following:

1. Connect to a SQL Server instance komodo_p8
2. Lists the available child objects
3. Steps into the Databases object
4. Lists the available children (database objects)
5. Steps into the AdventureWorks database
6. Lists the available child objects FIG. 7 illustrates an example 700 of accessing management functionality. In this case, the active connections per database are listed. Note that get-childitem is synonymous with the dir command. FIG. 8 illustrates an example 800 of performing a management operation. In this example 800, the space usage statistics of each database is updated.

Figure 9:
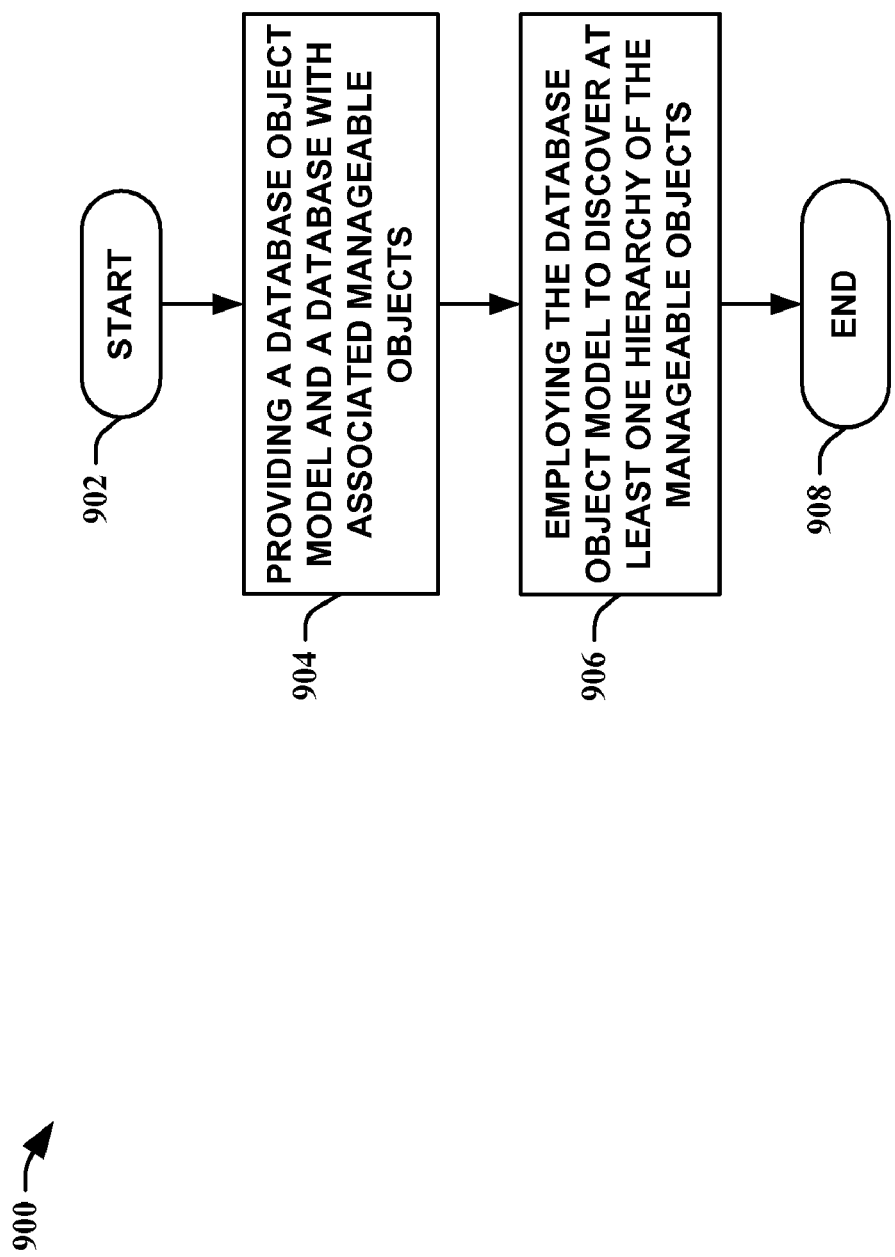
FIG. 9 is a flow diagram of a method for discovering a database object hierarchy in accordance with an aspect of an embodiment.
Figure 10:
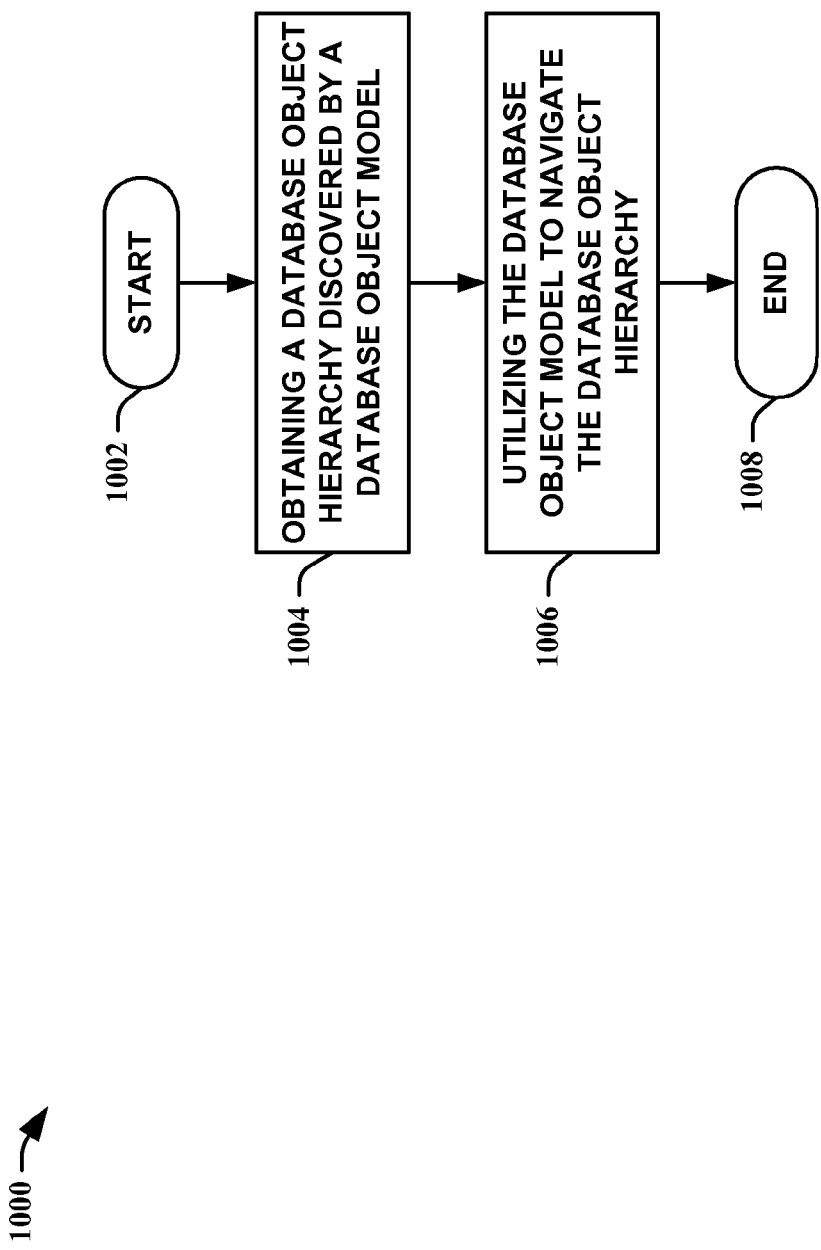
FIG. 10 is a flow diagram of a method for navigating a database object hierarchy in accordance with an aspect of an embodiment.
Figure 11:
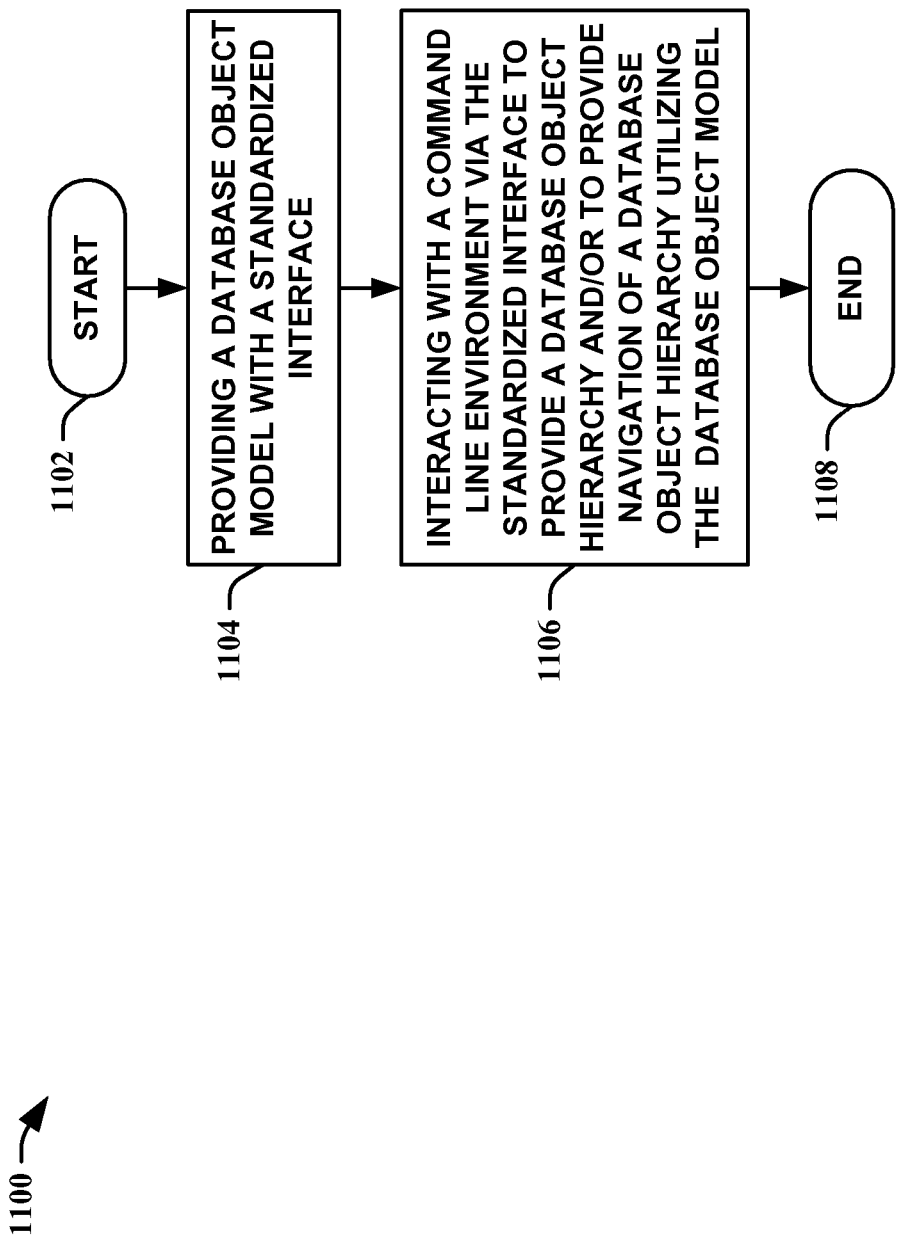
FIG. 11 is a flow diagram of a method for providing database object interaction via a command line environment in accordance with an aspect of an embodiment.

In view of the exemplary systems shown and described above, methodologies that may be implemented in accordance with the embodiments will be better appreciated with reference to the flow charts of FIGS. 9-11. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

In FIG. 9, a flow diagram of a method 900 for discovering a database object hierarchy in accordance with an aspect of an embodiment is shown. The method 900 starts 902 by providing a database object model and a database with associated manageable objects 904. The database object model is based upon a common object model framework as described supra. The database object model is then employed to discover at least one hierarchy of the database objects 906, ending the flow 908. In some instances the discovery can be accomplished via a script and/or stored as a document. This allows the database object model hierarchy to be self-describing. Typically, the discovery information is relayed to a user via a command line environment when requested. Extensible markup language (XML) files are an example of a type of document that can be employed. The document itself can contain additional metadata relating to connectivity, context and/or the database object hierarchy. Typically, the database object model and the command line environment reside client-side. However, this is not required and either component could be remotely located. Interaction with the manageable objects can be accomplished by wired and/or wireless communication means as described supra.

Looking at FIG. 10, a flow diagram of a method 1000 for navigating a database object hierarchy in accordance with an aspect of an embodiment is illustrated. The method 1000 starts 1002 by obtaining a database object hierarchy discovered by a database object model 1004. As described above, a database object model based on the previously described common object model framework can be utilized to discover database object hierarchies. The database object model is then utilized to navigate the database object hierarchy 1006, ending the flow 1008. Once a database object hierarchy is discovered, the database object model can exploit this information to peruse the hierarchy. Often, this is done at the request of a user who employs a command line environment to navigate the hierarchy. Documents and/or scripts utilized to obtain the database object hierarchy can also provide additional metadata relating to the navigability of the hierarchy. This information can also contain context information such that elements of navigation provide context when a database object model requires it.

Turning to FIG. 11, a flow diagram of a method 1100 for providing database object interaction via a command line environment in accordance with an aspect of an embodiment is depicted. The method 1100 starts 1102 by providing a database object model with a standardized interface 1104. The standardized interface is based upon the common object model framework described supra. A command line environment is then interacted with via the standardized interface to provide a database object hierarchy and/or to provide navigation of a database object hierarchy utilizing the database object model 1106, ending the flow 1108. The standardized interface allows the database object model to interface with a standard and/or a generic navigation mechanism (e.g., command line environment). The standardized interface can utilize a framework that provides for a base class type of connection that can be built upon. Since the generic navigation mechanism often resides on the client, it allows a single version to be disseminated to client computing devices that can interface with multiple types of database server software and/or structures. This substantially decreases a user's learning curve on managing diverse database servers. The user can now interface with multiple database servers/object models with a single program.

Figure 12:
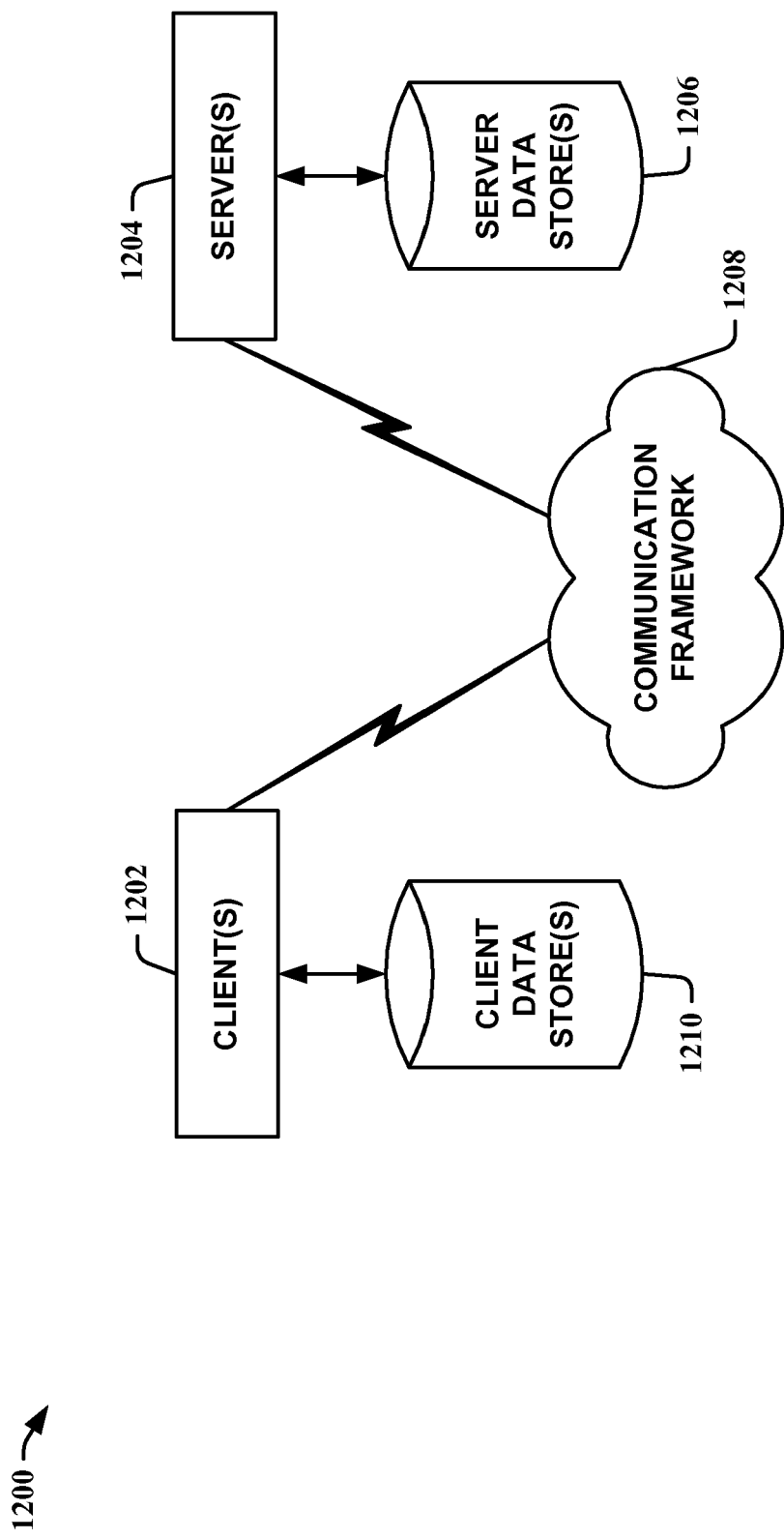
FIG. 12 illustrates an example operating environment in which an embodiment can function.

In order to provide additional context for implementing various aspects of the embodiments, FIG. 12 and the following discussion is intended to provide a brief, general description of a suitable computing environment 1200 in which the various aspects of the embodiments can be performed. While the embodiments have been described above in the general context of computer-executable instructions of a computer program that runs on a local computer and/or remote computer, those skilled in the art will recognize that the embodiments can also be performed in combination with other program modules. Generally, program modules include routines, programs, components, data structures, etc., that perform particular tasks and/or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based and/or programmable consumer electronics, and the like, each of which can operatively communicate with one or more associated devices. The illustrated aspects of the embodiments can also be practiced in distributed computing environments where certain tasks are performed by remote processing devices that are linked through a communications network. However, some, if not all, aspects of the embodiments can be practiced on stand-alone computers. In a distributed computing environment, program modules can be located in local and/or remote memory storage devices.

FIG. 12 is a block diagram of a sample computing environment 1200 with which embodiments can interact. The system 1200 further illustrates a system that includes one or more client(s) 1202. The client(s) 1202 can be hardware and/or software (e.g., threads, processes, computing devices). The system 1200 also includes one or more server(s) 1204. The server(s) 1204 can also be hardware and/or software (e.g., threads, processes, computing devices). One possible communication between a client 1202 and a server 1204 can be in the form of a data packet adapted to be transmitted between two or more computer processes. The system 1200 includes a communication framework 1208 that can be employed to facilitate communications between the client(s) 1202 and the server(s) 1204. The client(s) 1202 are connected to one or more client data store(s) 1210 that can be employed to store information local to the client(s) 1202. Similarly, the server(s) 1204 are connected to one or more server data store(s) 1206 that can be employed to store information local to the server(s) 1204.

It is to be appreciated that the systems and/or methods of the embodiments can be utilized in object model-based object hierarchy discovery and/or navigation facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that enables a user to interact with database objects, comprising a memory having stored therein computer executable components and a processor that executes the following computer executable components:
   a generic navigation component including a command-line interface, the command-line interface configured to connect the user to a first database server instance and further configured to discover or traverse a first hierarchy of database objects associated with the first database server instance and wherein the command-line interface is configured to connect the user to a second database server instance that is different from the first database server instance and further configured to discover or traverse a second hierarchy of database objects associated with the second database server instance;
   a first navigable object model that discovers the first hierarchy of database objects associated with the first database server instance and provides the first hierarchy of database objects to the generic navigation component, wherein the first navigable object model includes a standardized interface that utilizes a common interaction mechanism for interacting with the generic navigation component; and
   a second navigable object model that is different from the first navigable object model that discovers the second hierarchy of database objects associated with the second database server instance and provides the second hierarchy of database objects to the generic navigation component, wherein the second navigable object model includes the standardized interface that utilizes the common interaction mechanism for interacting with the generic navigation component;
   wherein the common interaction mechanism of the standard interface is configured to allow the generic navigation component to interact with the first and second navigable object models and with additional navigable object models implementing the common interaction mechanism of the standard interface regardless of the type of database server instance associated with the navigable object model such that the user need only utilize the generic navigation component when accessing the database sever instances.

2. The system of claim 1, wherein the navigable object model utilizes at least one of the following to provide the hierarchy of database objects to the navigation component:
   an object hierarchy document that contains information regarding the structure of database object hierarchies associated with the database objects: or
   a script that contains information regarding the structure of database object hierarchies associated with the database objects.

3. The system of claim 2, wherein at least one of the object hierarchy document or the script comprises an extensible markup language (XML) file.

4. A method for interacting with database server objects, wherein the method is performed by a processor that executes the following acts:
   providing a first database object model that represents first database server objects, the first database object model including a standardized interface that utilizes a common interaction mechanism for interacting with a generic navigation component;
   providing a second database object model that represents second database server objects, the second database object model including the standardized interface that utilizes the common interaction mechanism for interacting with the generic navigation component;
   employing the first database object model to discover at least one hierarchy of the first database server objects in response to receiving a user's request entered via a command-line interface included in the generic navigation component;
   employing the second database object model to discover at least one hierarchy of the second database server objects in response to receiving a user's request entered via the command-line interface; and
   navigating the at least one hierarchy of the first and second database server objects via the command-line interface of the generic navigation component, wherein the at least one hierarchy of the first and second database server objects are presented at the command-line interface in response to receiving the user's request
   wherein the common interaction mechanism of the standard interface is configured to allow the command-line interface of the generic navigation component to interact with the first and second database object models and with additional database object models implementing the common interaction mechanism of the standard interface regardless of the type of database server objects represented by the database object models such that a user need only utilize the command-line interface of the generic navigation component when accessing the database object models.

5. The method of claim 4, further comprising:
   employing the database object model to discover the at least one hierarchy of the database server objects based on at least one of a document or script.

6. The method of claim 5, further comprising:
   including meta data in the at least one of the document or script to indicate additional structural information of the database server objects.

7. The method of claim 5, further comprising:
   employing an extensible markup language (XML) in the at least one of the document or script to provide the at least one hierarchy of the database server objects to the command-line interface.

8. A device employing the method of claim 4, comprising at least one of: a computer, a server, or a handheld electronic device.

* * * * *